United States Patent Office 3,626,544
Patented Dec. 14, 1971

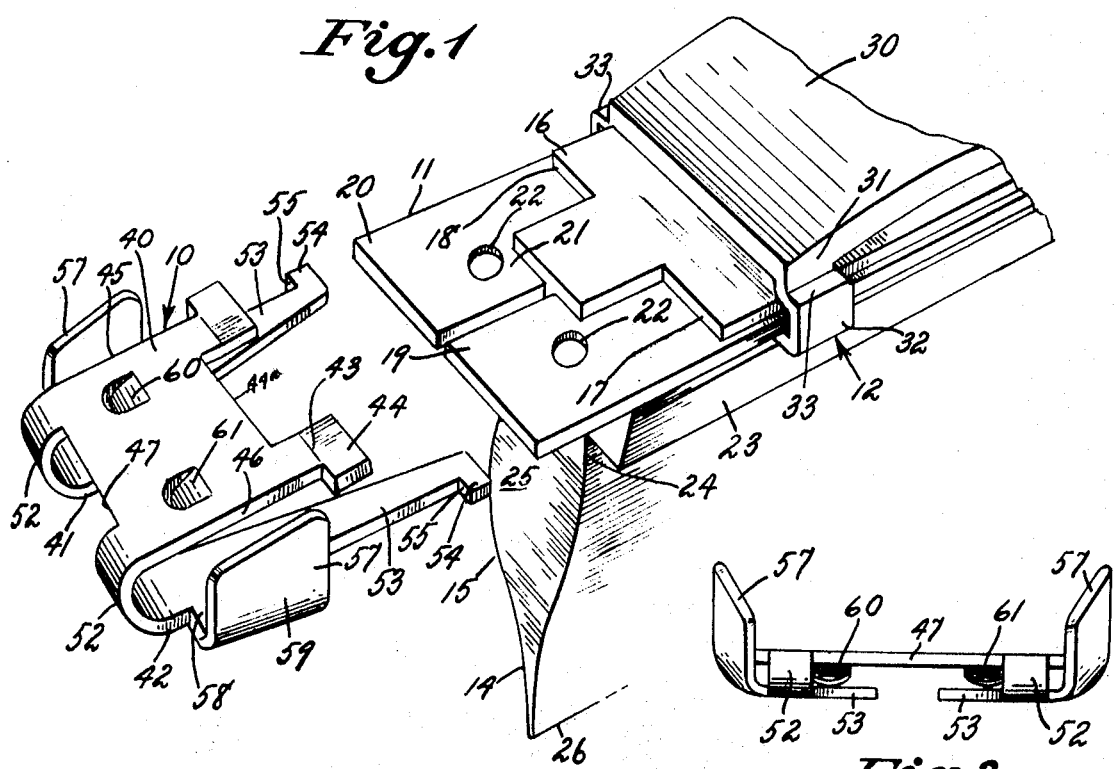
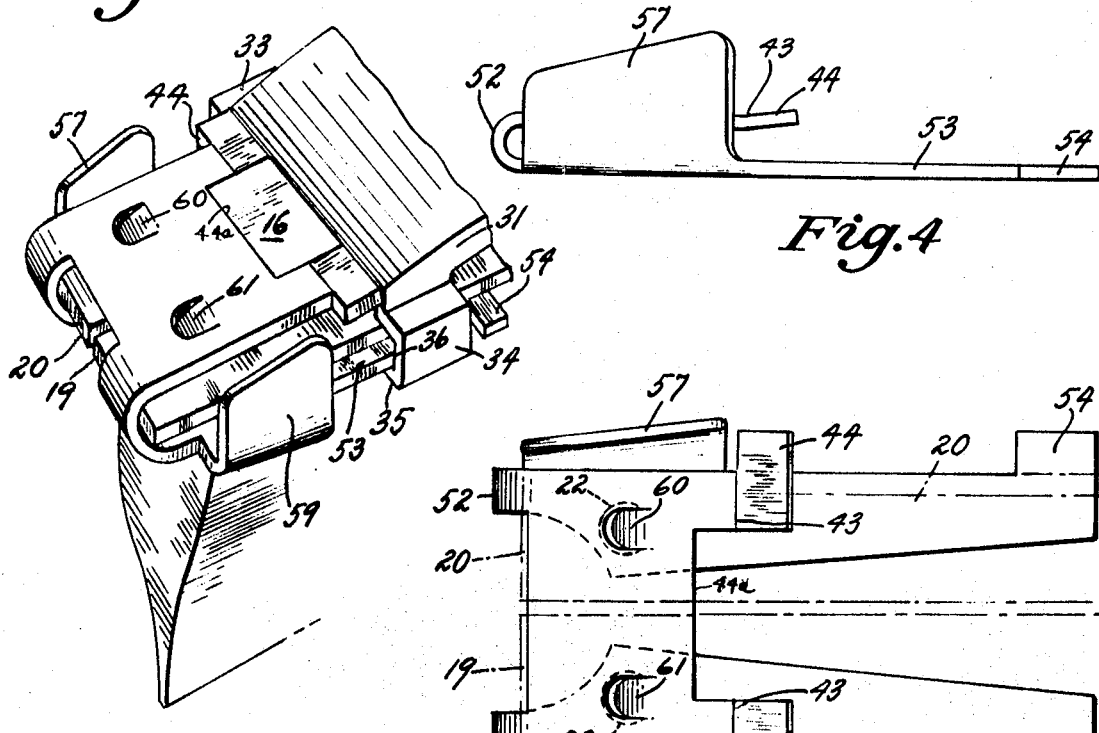

3,626,544
CLIP FOR WINDSHIELD WIPER BLADE REFILL
Manuel Lopez, Trumbull, and Thomas J. Chiaramonte, Shelton, Conn., assignors to The Roberk Company, Shelton, Conn.
Filed Sept. 16, 1970, Ser. No. 72,567
Int. Cl. B60s 1/02
U.S. Cl. 15—250.42                                     4 Claims

ABSTRACT OF THE DISCLOSURE

A clip structure for use with a windshield wiper blade refill comprising a main body member and a pair of resilient legs interconnected thereto by a corresponding pair of bent resilient parts, whereby said legs may be disposed parallel and beneath said main body member; said main body member defining a free laterally extending edge, said legs being resiliently compressible toward each other, and having laterally outwardly extending terminal lugs thereon, said lugs and said edge defining an interstice on either side of said clip, the width of which is resiliently adjustable within small limits upon engagement with a corresponding claw on a pressure distributing means forming part of a wiper blade.

---

This invention relates generally to the field of automotive windshield wiper blades, and more particularly to an improved clip structure suitable for use in conjunction with a wiper blade refill of the type normally including the rubber component and a pair of flexible elongated metal members which serve to interconnect the rubber member to a plurality of claws forming part of a pressure distributing element, another portion of which interconnects with the free end of a wiper arm. Devices of this general type are known in the art, and the invention lies in specific constructional details which permit the refill to be used in a universal manner, accommodating itself to each of the principal pressure distributing means produced by a plurality of manufacturers.

Windshield wiper blade construction of this general type is disclosed in U.S. Pat. No. 2,649,605 wherein the wiping element may be selectively removed from the pressure distributing superstructure for purposes of replacement, normal attrition of the rubber components of the device necessitating such replacement after 12 to 24 months of service. It is known to provide a replacement element including a rubber blade, and a pair of flexible elongated backing strips which engage corresponding grooves in the blade on inner edges thereof, and claws on the pressure distributing means. The replacement operation consists of releasing a latching or retaining means on the original blade, sliding the backing strip from engagement with the claws, and inserting with a sliding motion the replacement unit. This is maintained against longitudinal movement either by the engagement of a latch with one of the claws, or the backing strip is provided with a clip on each end thereof, one of which is supplied in disengaged condition for installation on the trailing edge of the replacement unit after sliding engagement with the claw has been obtained. The latter construction permits a degree of universality, in that relative movement in one direction is prevented by engagement of one of the clips with one claw, and movement in the opposite direction by engagement of a second clip with a second claw. The former construction, while relatively simple to use, invariably provides a latch having a recess of width corresponding to the width of the claw, thus preventing the use of the refill unit in conjunction with pressure distributing structure of other than the same manufacturer. The latter construction does allow some longitudinal movement, and calls for considerable manual dexterity in engaging the clip upon the backing strips to a degree not possessed by the average motorist, thereby making consumer installation difficult.

It is therefore among the principal objects of the present invention to provide an improved construction in which the above mentioned disadvantages have been substantially eliminated.

Another object of the invention lies in the provision of an improved terminal clip which replaces the latch means of prior art devices which may be installed upon the backing strips at the point of manufacture, to permit convenient user installation, while simultaneously incorporating provision for differences in the width of engaged claws of various manufacture, whereby a single replacement unit may have universal application.

Yet another object of the invention lies in the provision of an improved retaining clip of the class described, which may be both conveniently engaged and disengaged with respect to a pressure distributing claw, thereby facilitating subsequent replacement.

A further object of the invention lies in the provision of improved structure of the class described, in which the cost of fabrication may be of a reasonably low order, thereby permitting consequent wide sale, distribution and use.

These objects, as well as other incidental ends and advantages, will more fully appear in the progress of the following disclosure, and be pointed out in the appended claims.

In the drawing, to which reference will be made in the specification, similar reference characters have been employed to designate corresponding parts through the several views.

FIG. 1 is a fragmentary exploded view in perspective of an embodiment of the invention.

FIG. 2 is a similar fragmentary view in perspective showing the components of FIG. 1 in fully assembled condition.

FIG. 3 is an end elevational view of a clip element forming a part of the disclosed embodiment.

FIG. 4 is a side elevational view of the clip element, as seen from the right hand portion of FIG. 3.

FIG. 5 is a top plan view of the clip element showing the engagement thereof upon a pair of backing strips supporting a wiper blade.

In accordance with the invention, the device, generally indicated by reference character 10, is illustrated in the drawing in conjunction with a wiper blade refill element 11, and engaging a claw element 12 of a pressure distributing means (not shown).

As is conventional in the art, the wiper blade refill element 11 includes a rubber wiper member 14 of conventional type, including a lower portion 15 and an upper portion 16 defining a pair of grooves 17 and 18 into which elongated flexible backing members 19 and 20 are fitted. The end portions 21 of the backing members are provided with openings 22 for engagement with means interconnecting the same to assure retention of the blade member 14, as is known in the art. In the present construction, the opposite similar end (not shown) may be interconnected by a wire staple, or similar construction known in the art.

The lower portion 15 of the wiper member 14 may include a planar part 23, interconnected by a flexible web 24 to a pivotally mounted member 25 having a blade edge 26 thereon. The lower portion 15 is interconnected to the upper portion 16 by a web 27 which forms an inner surface of each of the grooves 17 and 18, again, as known in the art.

The claw element 12 will vary in detail, depending upon manufacture, and includes a main body 30, an end portion 31 of which is modified to form a claw member 32. The member 32 includes a pair of laterally extending members 33, a pair of bridging members, one of which is indicated by reference character 34, and a second laterally extending member 35, the members 33–35 defining interstices, one of which is indicated by reference character 36 which slidably engage the outer edges of the members 19 and 20.

The device 10 is preferably formed as a metallic stamping from relatively thin gauge stainless steel, and includes a main body member 40, and first and second resilient leg members 41 and 42, respectively.

The main body member 40 is of generally planar configuration, and includes a pair of end edge defining portions 44 bent slightly upwardly along a line 43 to permit easy engagement with the members 19 and 20, as will more fully appear. A recess 44a is formed therebetween to accommodate the edge of the blade member 25. The member 40 is also bounded by side edges 45 and 46, and a rear end edge 47. It will be observed that the edge portion 44 is approximately the width of the claw element 12 with which it is ultimately engaged.

The first and second resilient leg members 41 and 42 are similar and symmetrical, each including a curved resilient terminal portion 52, an elongated shank portion 53, and laterally extending terminal lugs 54, rearward edges 55 of which form locking abutments with respect to the claw element 12.

Disposed on either side of the main body member 40, and connected to the first and second link members 41–42 are a pair of manually engageable compression portions 57, each including a laterally extending part 58 and an upstanding part 59, the extremity of which projects above the main body member 40. Punched from the plane of the main body member 40 are a pair of downwardly extending tabs 60 and 61 spaced to correspond to the openings 22 in the flexible members 19 and 20.

The clip 10 is installed upon the members 19–20 by simply pushing the same thereon, as indicated in FIG. 5. When fully seated, the tabs 60–61 will penetrate the openings 21, and prevent accidental removal thereof. This installation is made after the wiper member 14 has been engaged with the members 19 and 20, so that the engagement of the clip maintains the entire refill unit in assembled condition.

To install the refill unit, the deteriorated unit previously inserted (not shown) is removed. Next, the flexible members 19 and 20 are slid into engagement with all of the claws of the pressured distributing unit, including the lead claw 12, using a sliding motion. As the refill unit is almost completely seated, the compression portions 57 are squeezed together, permitting the lugs to pass into the interstice 36, and they are maintained in this position until the lugs have cleared the interstice, at which position the edge member 44 will abut the main body 30 as shown in FI1. 2. Release of the compression portions 57 permits the clip to return to relatively unstressed condition, thus completing the engagement, and preventing longitudinal movement of the refill unit with respect to the pressure distributing unit. To remove the refill, the compression portions 57 are again compressed, and the refill unit is withdrawn from engagement with the claw element 12.

It will be observed that the means for preventing longitudinal movement is present at one end only of the refill unit, thereby making it unnecessary to provide a separate clip which must be manually installed by the user. Further, owing to the presence of the resilient terminal portions 52, should the longitudinal length of the members 33–35 vary, depending upon the source of manufacture, use of the clip is still possible, since the width of the interstice may be varied slightly as the same is engaged upon the claw, the adjustment to be maintained by such engagement. Thus, minor variations may be immediately accommodated for with a perfect fit. Where an even greater range of sizes is required, because of the frictional engagement of the outer surfaces of the legs with the inner surface of the claw, longitudinal movement is hindered to a much greater degree than that possible where two separate end clips are employed.

We wish it to be understood that we do not consider the invention limited to the precise details of structure shown and set forth in this specification, for obvious modifications will occur to those skilled in the art to which the invention pertains.

We claim:

1. A clip for use with a windshield wiper blade refill comprising: a main body member and a pair of integral leg members, said main body member being of generally planar configuration, having a principal axis and defining a free transversely extending end edge member; said pair of leg members being symmetrically disposed upon either side of said principal axis and interconnected to said main body member and by resilient arcuate portions thereon so as to lie beneath said main body member in a plane substantially parallel thereto; said leg members having laterally opposed terminal lug portions disposed in spaced parallel relation relative to said free end edge member.

2. Structure in accordance with claim 1, including a pair of finger-engageable portions for manually squeezing said legs toward each other.

3. Structure in accordance with claim 1, said main body member including a pair of downwardly bent tabs cut therefrom and overlying said leg members.

4. Structure in accordance with claim 3 in combination with a pair of elongated flexible wiper blade supporting members having openings at the end portions thereof corresponding in location to said tabs, and engaged therewith.

References Cited
UNITED STATES PATENTS

| | | | |
|---|---|---|---|
| 2,983,945 | 5/1961 | De Pew | 15—250.42 |
| 3,233,273 | 2/1966 | Anderson | 15—250.42 |
| 3,430,285 | 3/1969 | Rickett | 15—250.42 |

PETER FELDMAN, Primary Examiner